July 14, 1925.
D. D. MASTERS ET AL
1,546,096
COMBINATION TIRE CHAIN LOCK AND CHAIN TIGHTENER
Filed May 3, 1924
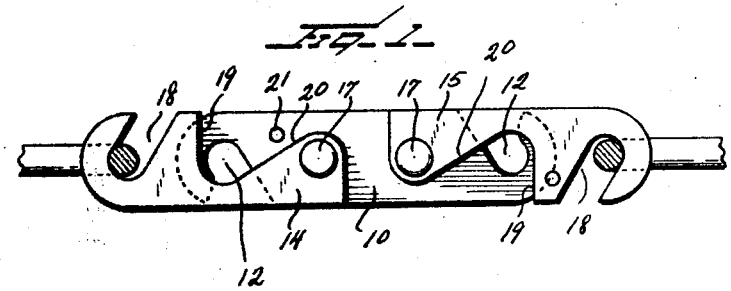
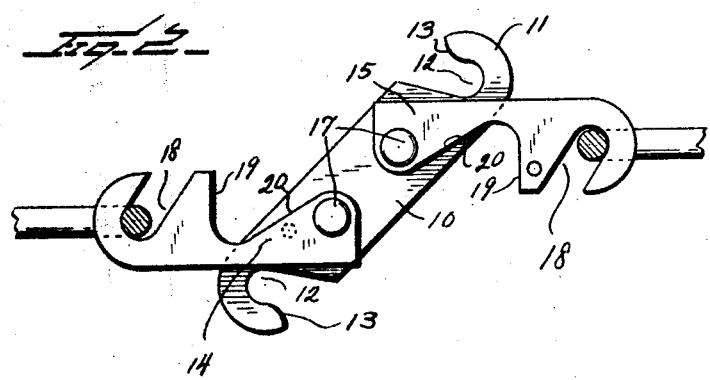
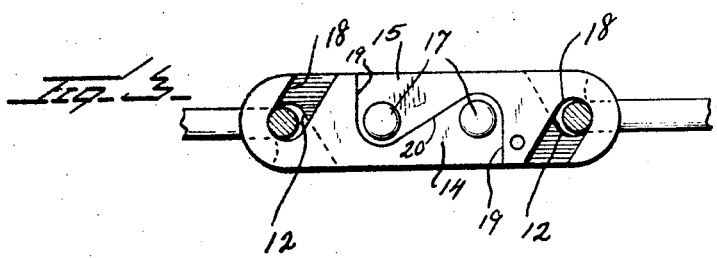
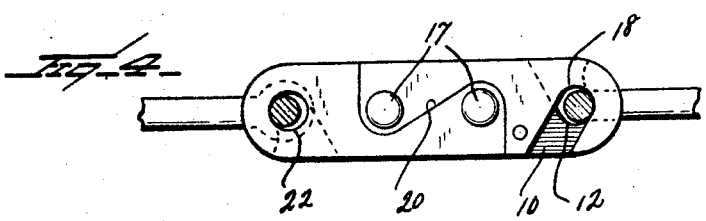
Inventors
Dave D. Masters
+ Charles H. Brandt
By Watson E. Coleman
Attorney Patented July 14, 1925.

1,546,096

UNITED STATES PATENT OFFICE.

DAVE D. MASTERS AND CHARLES H. BRANDT, OF BUFFALO, WYOMING.

COMBINATION TIRE-CHAIN LOCK AND CHAIN TIGHTENER.

Application filed May 3, 1924. Serial No. 710,890.

*To all whom it may concern:*

Be it known that we, DAVE D. MASTERS and CHARLES H. BRANDT, citizens of the United States, residing at Buffalo, in the county of Johnson and State of Wyoming, have invented certain new and useful Improvements in Combination Tire-Chain Locks and Chain Tighteners, of which the following is a specification, reference being had to the accompanying drawings.

This invention relates to the connecting fasteners or locking links of tire chains such as are used for securing traction for automobile wheels on muddy roads.

If the full benefit of the traction gained by the use of chains on vehicle wheels is to be secured when the roads are muddy or snowy, it is quite necessary to have the chain tight and it is often necessary to wire the chain to the wheel in order to keep a tire from spinning around within the chain, thus rendering the chain useless. It is extremely difficult to draw a chain tight without an instrument for this purpose and impossible to tighten the chain sufficiently with one's fingers to keep a tire from spinning inside it under heavy road conditions.

This being true, the object of the present invention is to provide a combined locking link such as is ordinarily used for connecting tire chains and a chain tightener, or in other words to provide a link which will provide means whereby the chain may be tightened on the tire, while at the same time the chain is locked in place.

A further object is to provide a construction of this kind which is very simple, which has been found to be thoroughly effective for the purpose, and wherein there is no slackening of the chain after it is tightened.

A still further object is to provide a device of this character which has a relatively large tightening capacity.

Other objects will appear in the course of the following description.

Our invention is illustrated in the accompanying drawings, wherein:—

Figure 1 is a side elevation of our chain tightener and lock extended;

Figure 2 is a like view to Figure 1, but showing the position of the parts when the chain is being tightened;

Figure 3 shows the chain tightener contracted;

Figure 4 is a like view to Figure 3, but showing a slight modification of the parts.

Referring to these figures, 10 designates what may be termed the fixed section of the link. This is formed of a strip of metal having the requisite thickness, width and length, the strip being so formed as to provide two hooks at its opposite ends. The hooks fasten in the opposite direction and toward a line drawn through the middle of the link. The bills of the hooks are designated 11 and the slot which defines the bill of the hook from the body of the strip 10 is longitudinally and medially inclined, as at 12. The bill of each hook has a rounded end, designated 13.

Pivotally mounted upon the strip 10 are the two hook members 14 and 15, these being exactly alike in shape but reversed relative to each other. Each of the hook members is formed with a strip of metal rounded at its free extremity and pivoted at 17 to the clip 10. Each hook member 14 is formed at its free extremity with a slot 18 which extends inward and longitudinally at a slight angle, and rearward of this slot the edge of the hook member is recessed, this recess having a wall 19 which is at right angles to the length of the hook member, and a rearwardly inclined wall 20, these walls merging into each other.

In the use of this device, when the tightener and link is to be applied, the hook members are turned to the position shown in Figure 1 so that the hook members extend beyond the bills of the hooks 11 and the slots 18 are engaged with the links of the chain. The chain is, of course, applied upon the tire at this time. When it is desired to tighten the chain, the strip or body portion 10 is rotated in the direction of the arrow in Figure 2 and thus the pivots for the link 15 and 14 are shifted past each other so as to thus draw the two hooks 14 and 15 toward each other until the parts are in the position shown in Figure 3. Under these circumstances the rear portion of each hook member fits into the recess defined by the walls 19 and 20 of the other hook member and the parts are thus locked in position.

When the hook members are brought to the position shown in Figure 3, the slots 18 will intersect the slots defined by the bills 11 of the body 10. The pull being lengthwise, it is obvious that no strain will be applied to the hook members which will tend to rotate the body 10 back to its original position and under these circumstances the locking link is locked and the chain held taut upon the tire. When it is desired to release the chain, it is only necessary to turn the member 10, which constitutes in effect a lever, in a reverse direction to that in which it has first rotated and this will again carry the parts to the position shown in Figure 1, thus slackening the chain and permitting the ready detachment of the links from the hook members.

It will be seen that there is a difference in overall length between Figures 1 and 3, which in a full sized link will be approximately 1¾″. If desired, a hole 21 may be drilled through one of the hook members and the body 10 so as to permit the insertion of a cotter pin as an emergency lock.

It will be seen that our construction supplies leverage whereby the chain may be drawn together and at the same time the construction provides a link which will lock upon the chain. There is no slackening up of the chain after the link is closed or the link contracted as it is in many chain locks known to us.

We do not wish to be limited to the exact form of the device as shown in Figures 1, 2 and 3, and in Figure 4 we show a slight modification wherein the link is adapted to be applied to the ordinary Weed chain. In this case one of the hook members 14 or 15 is provided, not with a slot 18, but with an aperture 22 at one end whereby it may be fastened to one end of the chain by means of a rivet through the aperture. Otherwise than this, the link shown in Figure 4 is identical in all respects with that shown in Figures 1, 2 and 3 and the only difference is that it is not detachable from the chain.

This combination tire chain lock and tightener serves each and every purpose of the ordinary locking link but does away with the necessity of using extra tools to apply it, and furthermore acts to tighten the chain. It is very cheaply and simply constructed and no tools are necessary for its manipulation. It will be understood that this device may be used on either transverse links or longitudinally extending links of tire chains or in any situation which is applicable.

We claim:—

1. A combined locking link and chain tightener of the character described comprising a body portion formed to provide oppositely disposed hooks opening in opposite directions, a pair of coacting hook members pivoted upon said body member on each side of the center thereof, the hooks extending in opposite directions and being formed with hooks at their extremities, the hooks opening in opposite directions whereby when said body member is rotated it will carry the butt ends of the hooks past each other and thereby tighten the chain, the body member when so rotated through 180° carrying its hook members into coincidence with the hooks on the extremities.

2. A combined locking link and chain tightener of the character described comprising a body formed at its ends with hooks, the hooks opening in opposite directions and the bills of the hooks extending laterally and rearwardly and two hook members associated with the body member and pivoted thereto, the hook members extending in opposite directions and at their extremities being angularly slotted, the hook members each having one margin recessed between the slotted hook member and its pivot to receive the rear portion of the other hook member when the body has been rotated through 180° to carry the rear portions of the hook members into overlapping relation.

In testimony whereof we hereunto affix our signatures.

DAVE D. MASTERS.
CHARLES H. BRANDT.